(12) United States Patent
Aburatani et al.

(10) Patent No.: US 7,411,027 B2
(45) Date of Patent: Aug. 12, 2008

(54) MODIFIED DIENE-α-OLEFIN COPOLYMER AND METHOD FOR PRODUCING SAME

(75) Inventors: Ryo Aburatani, Ichihara (JP); Yuichi Fukunaga, Ichihara (JP)

(73) Assignee: Sartomer Idemitsu Co., Ltd., Tokyo (JP)

( * ) Notice: Subject to any disclaimer, the term of this patent is extended or adjusted under 35 U.S.C. 154(b) by 0 days.

(21) Appl. No.: 10/588,509

(22) PCT Filed: Feb. 9, 2005

(86) PCT No.: PCT/JP2005/001917

§ 371 (c)(1),
(2), (4) Date: Aug. 4, 2006

(87) PCT Pub. No.: WO2005/075516

PCT Pub. Date: Aug. 18, 2005

(65) Prior Publication Data

US 2007/0135582 A1    Jun. 14, 2007

(30) Foreign Application Priority Data

Feb. 10, 2004  (JP) .............................. 2004-033067

(51) Int. Cl.
    *C08F 136/06*  (2006.01)
(52) U.S. Cl. ................. 526/340.4; 526/329.1; 526/328; 526/346
(58) Field of Classification Search .............. 526/329.1, 526/328, 346, 340.4
    See application file for complete search history.

(56) References Cited

U.S. PATENT DOCUMENTS 4,041,104 A * 8/1977 Selley ...................... 525/126

FOREIGN PATENT DOCUMENTS

| JP | 47 8626 | 3/1972 |
| JP | 48 96689 | 12/1973 |
| JP | 49 51388 | 5/1974 |
| JP | 50 7893 | 1/1975 |
| JP | 50 18582 | 2/1975 |
| JP | 62 148346 | 7/1987 |
| JP | 2002 196479 | 7/2002 |
| JP | 2002 371101 | 12/2002 |

\* cited by examiner

*Primary Examiner*—Ling-Siu Choi
(74) *Attorney, Agent, or Firm*—Oblon, Spivak, McClelland, Maier & Neustadt, P.C.

(57) ABSTRACT

A modified diene-α-olefin copolymer which is represented by the formula (1) below and has $H_2C=C(R^5)-COO-$ in at least a part of the ends.

(1)

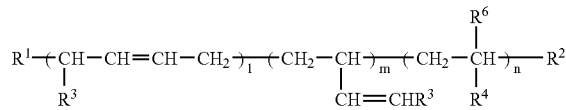

wherein $R^1$ and $R^2$ independently represent a hydroxyl group or $H_2C=C(R^5)-COO-$, $R^3$s, $R^5$s, and $R^6$s are independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition.

13 Claims, 1 Drawing Sheet

MODIFIED DIENE-α-OLEFIN COPOLYMER AND METHOD FOR PRODUCING SAME

TECHNICAL FIELD

The invention relates to a modified diene-α-olefin copolymer and a method for producing the same. More specifically, the invention relates to a low molecular weight modified diene-α-olefin copolymer produced by modifying a low molecular weight diene-α-olefin copolymer having a hydroxyl group at an end, obtained from a conjugated diene compound and an α-olefin compound, with an unsaturated carboxylic acid or its derivative, and to a method for producing the same.

BACKGROUND ART

Because it is difficult to cause a non-polar polyolefin, a rubber component, and the like to become soluble with or to adhere to a polar polymer, an inorganic material, and the like, various compatibilizers and adhesives have been developed. In general, polyolefins and rubber components modified with a polar compound are used. Such modified products have a high industrial value.

Specifically, a number of polyethylenes and polypropylenes modified with maleic anhydride or chlorine are commercially available. These modified products are used for applications such as a compatibilizer, adhesive, agglutinant, primer, and the like. They are produced using a modifier compound and/or a polar compound capable of forming radicals. This method, however, cannot introduce thermally instable substituents such as a (meth)acryloyl group into molecules.

As the method for introducing a thermally instable substituent, a method of previously introducing a substituent having reactivity with such a thermally instable substituent into the molecular end and introducing the target group via this reactive group can be given, for example. However, since a special catalyst system and polymerization technique are required in order to efficiently introduce a reactive group into the molecular end, this method is difficult to apply to industrial scale production. In addition, because the rate of introduction is low if such groups are introduced only to the ends of polymers, the effect of introduction is insufficient in many cases.

On the other hand, it has been disclosed that in the case of diene monomers, reactive groups such as a hydroxyl group can be efficiently introduced to the end of the polymer by using a special catalyst system (Japanese Patent Application Laid-open No. 50-18582). The hydroxyl group at the end is used for introducing suitable functional groups (Japanese Patent Applications Laid-open No. 62-148346 and 2002-371101).

The effect of introducing functional groups into ends is increased particularly in the case of a lower polymer having reactive groups at the ends, since the proportion of the end groups inevitably increases in the case of such a lower polymer. In addition, the effect of compatibility and adhesiveness is thought to be effectively controlled in a wide range if a suitable olefin compound is copolymerized with the main chain structure of a polymer having a reactive end.

The invention has been achieved in view of the above-described problem. An object of the invention is to provide a modified diene-α-olefin copolymer with improved compatibility and adhesiveness and a method for producing the same.

DISCLOSURE OF THE INVENTION

As a result of extensive studies to achieve the above object, the present inventors have found that a modified copolymer having a novel structure obtained by changing the copolymer composition ratio of a diene-α-olefin copolymer and modifying the terminal hydroxyl groups with an unsaturated carboxylic acid or a derivative thereof is effective. This finding has led to the completion of the invention.

According to the invention, the following diene-α-olefin copolymers and the like are provided.

1. A modified diene-α-olefin copolymer which is represented by the formula (1) below and has $H_2C=C(R^5)-COO-$ in at least a part of the ends,

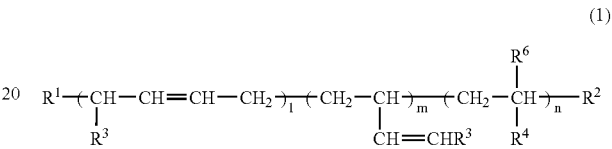

(1)

wherein $R^1$ and $R^2$ independently represent a hydroxyl group or $H_2C=C(R^5)-COO-$, $R^3$s, $R^5$s, and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition.

2. The modified diene-α-olefin copolymer according to 1, having a number average molecular weight of 300 to 10,000.

3. The modified diene-α-olefin copolymer according to 1 or 2, wherein the amount of α-olefin compounds is 1 to 90 mol % in the total amount of the copolymer.

4. The modified diene-α-olefin copolymer according to any of 1 to 3, wherein the proportion of the end with a structure of $H_2C=C(R^5)-COO-$ is 20 to 100 mol % of the total end groups.

5. The modified diene-α-olefin copolymer according to any one of 1 to 4, wherein $R^4$ is a phenyl group.

6. A method for producing the modified diene-α-olefin copolymer according to any one of 1 to 5, comprising reacting a diene-α-olefin copolymer shown by the following formula (2) with an unsaturated carboxylic acid shown by the following formula (3) or a derivative thereof, adding 1 mg to 1 g of a radical scavenger per 100 g of the copolymer,

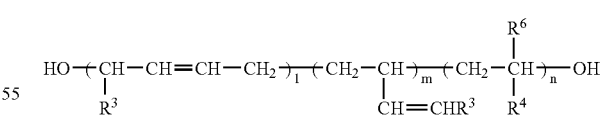

(2)

wherein $R^3$s and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition, $$H_2C=C(R^5)-COOH \quad (3)$$

wherein $R^5$ is a hydrogen atom or an alkyl group with 1 to 10 carbon atoms.

7. The method for producing the modified diene-α-olefin copolymer according to 6, wherein the modified diene-α-olefin copolymer is reacted with the unsaturated carboxylic acid or a derivative thereof in a solvent, the concentration of the copolymer in the solvent being 50 wt % or less.

According to the invention, a modified diene-α-olefin copolymer with improved adhesiveness and compatibility and a method for producing the same can be provided.

BEST MODE FOR CARRYING OUT THE INVENTION

Figure 1:
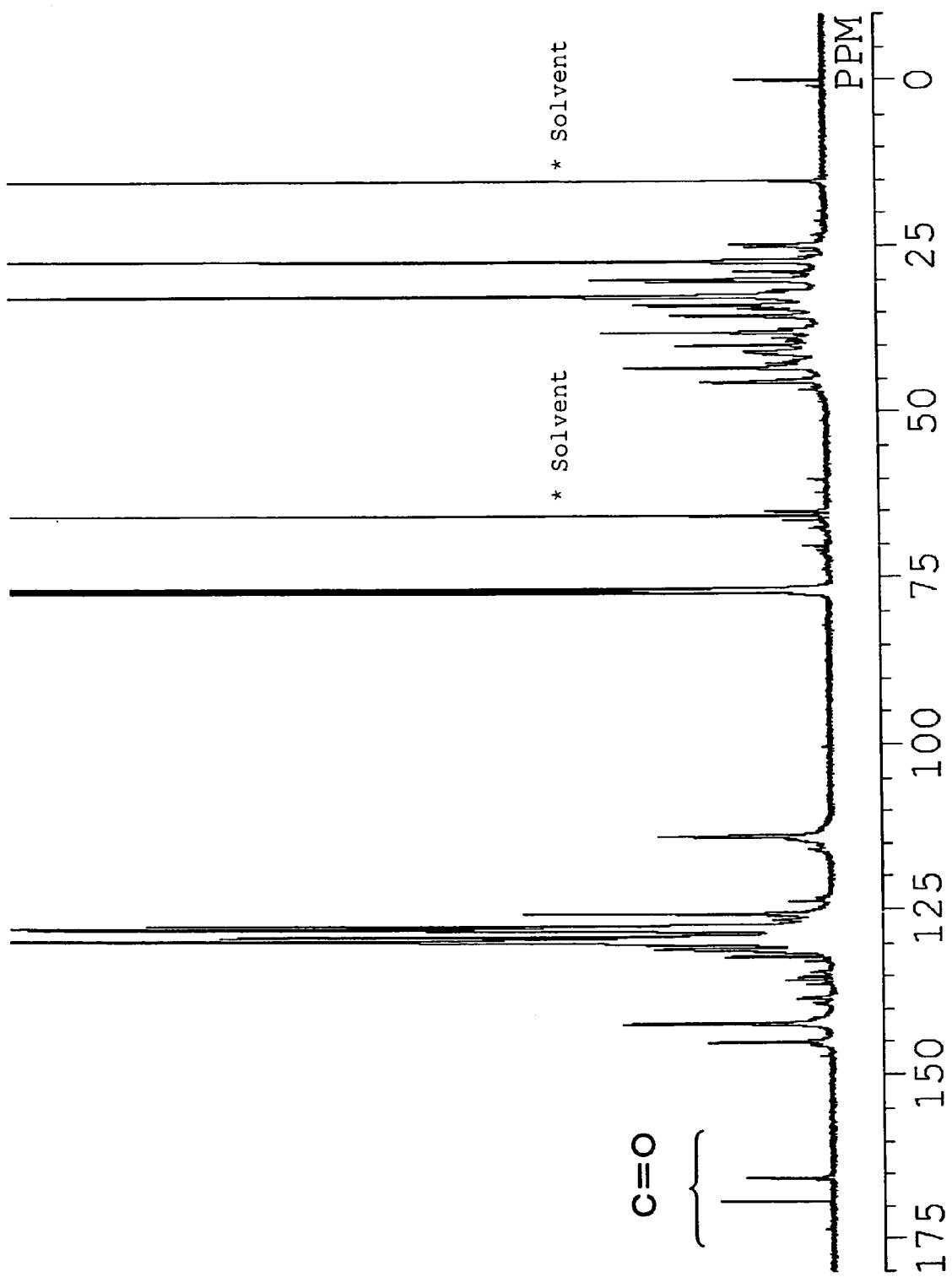
FIG. 1 shows a $^{13}$C-NMR spectrum chart of the modified butadiene-styrene copolymer of Example 1.

The modified diene-α-olefin copolymer of the invention (hereinafter referred to as "modified copolymer") comprises a structural unit derived from a conjugated diene compound and a structural unit derived from an α-olefin compound represented by the following formula (1), of which at least a part of the ends is $H_2C=C(R^5)—COO—$,

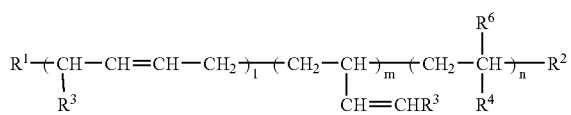

(1)

wherein $R^1$ and $R^2$ independently represent a hydroxyl group or $H_2C=C(R^5)—COO—$, $R^3$s, $R^5$s, and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition.

In the formula (1), the alkyl group having 1 to 10 carbon atoms may be any of a linear alkyl group, a branched alkyl group, or a cycloalkyl group. Preferable examples of $R^3$, $R^5$, and $R^6$ are a hydrogen atom or a methyl group. A methyl group and an ethyl group are preferable for the alkyl group contained in the carbonyloxyalkyl group of $R^4$.

The molar ratio (%) of the structural unit originating from conjugated diene compounds to the structural unit originating from α-olefin compounds in the modified copolymer of the invention, i.e. the molar ratio (%) of the amount of conjugated diene compounds (the total of l and m in the formula (1)) to the amount of α-olefin compounds (n in the formula (1)) is preferably 10:90 to 99:1, more preferably 20:80 to 98:2, and still more preferably 30:70 to 97:3. If the ratio of the structural unit originating from α-olefin compounds is less than 1 mol %, the effect of improved adhesiveness and compatibility, which is the objective of the invention, may not be sufficiently achieved. If more than 90 mol %, on the other hand, characteristics inherent to diene polymers may be lost and the material obtained from the polymer may not possess flexibility.

The manner of polymerization of the structural units forming the modified copolymer is not specifically limited in the invention.

The number average molecular weight of the modified copolymer is 300 to 10,000, and preferably 500 to 5,000. If the number average molecular weight is less than 300, the polymer may become brittle after photocuring, failing to exhibit the target performance. On the other hand, if more than 10,000, the relative proportion of modified parts decreases, resulting in poor compatibility. In addition, handling of the polymer becomes difficult due to an increase in viscosity.

The modified copolymer can be produced by reacting the diene-α-olefin copolymer shown by the following formula (2) (hereinafter referred to as "unmodified copolymer") with an unsaturated carboxylic acid or a derivative thereof shown by the following formula (3) (hereinafter referred to as "modifier") in a solvent,

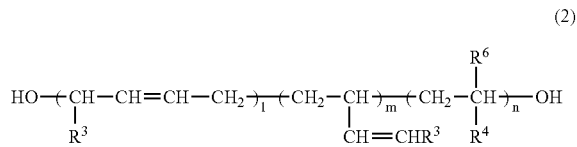

(2)

wherein $R^3$s and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition,

$$H_2C=C(R^5)—COOH \qquad (3)$$

wherein $R^5$ is a hydrogen atom or an alkyl group with 1 to 10 carbon atoms.

Preferable $R^3$, $R^5$, and $R^6$ in the formulas (2) and (3) are the same as the groups mentioned above. Preferable alkyl groups contained in the carbonyloxyalkyl group represented by $R^4$ are also the same as the groups mentioned above.

The number average molecular weight of the unmodified copolymer is 300 to 10,000, and preferably 500 to 5,000. If the number average molecular weight is less than 300, the polymer may become brittle after photocuring, failing to exhibit the target performance. On the other hand, if more than 10,000, the relative proportion of hydroxyl groups decreases, resulting in poor compatibility. In addition, handling of the polymer becomes difficult due to an increase in viscosity.

The content of hydroxyl groups of the unmodified copolymer is preferably 0.2 to 10 mol/kg, and more preferably 0.4 to 7 mol/kg. If the content of hydroxyl groups is less than 0.2 mol/kg, the effect of introducing hydroxyl groups decreases, resulting in a copolymer which may not exhibit target effects in various applications. If more than 10 mol/kg, on the other hand, characteristics inherent to rubbers may be lost due to increased polar structures, resulting in a brittle structure.

The unmodified copolymer preferably contains 50 mol % or more of cis and trans 1,4-structures in total.

Hydroxyl groups may be present not only at the ends of the molecular chains of the unmodified copolymer, but also inside the molecular chains. However, it is more preferable that hydroxyl groups be present at the ends of the molecular chains.

The unmodified copolymer can be produced by copolymerizing a conjugated diene compound with an α-olefin compound in the presence of a catalyst (a polymerization initiator).

As the conjugated diene compound, diolefin hydrocarbons having 4 to 12 carbon atoms are preferable. As specific examples, 1,3-butadiene, 1,3-pentadiene, and the like can be given.

In addition to these compounds, isoprene (2-methyl-1,3-butadiene), chloroprene (2-chloro-1,3-butadiene), cyclopentadiene, 2,3-dimethyl-1,3-butadiene, and the like can be used in the invention.

As the α-olefin compound, unsaturated group-containing compounds having 2 to 12 atoms (preferably carbon atoms) are preferable.

As specific examples, styrene, α-methylstyrene, 4-methylstyrene, acrylonitrile, acrylic acid and its esters (e.g. methyl acrylate, ethyl acrylate, etc.), methacrylic acid and its esters (e.g. methyl methacrylate, ethyl methacrylate, etc.), vinyl chloride, vinyl acetate, acrylamide, 2-vinylpyridine, vinylcyclohexane, and the like can be given.

These olefin monomers may be used either individually or in combination of two or more.

As the catalyst for copolymerization, hydrogen peroxide ($H_2O_2$), azo compounds having a hydroxyl group (e.g. 2,2'-azobis[2-methyl-N-(2-hydroxyethyl)propionamide], etc.), peroxide compounds having a hydroxyl group (e.g. cyclohexanone peroxide, etc.), and the like can be given.

The amount of the catalyst used for 100 g of the total amount of dienes and styrenes is, for example, 1.0 to 50 g in the case of $H_2O_2$, 5.0 to 100 g in the case of 2,2'-azobis[2-methyl-N-(2-hydroxyethyl)propionamide], and 5.0 to 100 g in the case of cyclohexanone peroxide.

Although the copolymerization may be carried out without using a solvent, use of a solvent is preferable in view of ease of reaction control and post-treatment after the copolymerization, and the like. As the solvent, ethanol, isopropanol, n-butanol, or the like are usually used.

A reaction temperature of 80 to 150° C. and a reaction time of 0.5 to 15 hours are appropriate.

It is possible to mix two or more conjugated diene compounds and two or more α-olefin compounds in the copolymerization to produce a ternary or higher member copolymer.

In addition, it is possible to anionically copolymerize a conjugated diene compound with an α-olefin compound using a catalyst such as naphthalenedilithium or the like to produce a living polymer, then react the living polymer with a monoepoxy compound or the like to produce a copolymer.

Although this copolymerization may be carried out without using a solvent, use of a solvent is preferable for the same reasons as mentioned in the case of the radical polymerization. As the solvent, saturated hydrocarbons such as hexane and cyclohexane are preferably used.

A reaction temperature of 50 to 100° C. and a reaction time of 1 to 10 hours are appropriate.

After the reaction, the reaction solution is distilled under reduced pressure to remove the solvent, unreacted monomers, and the like thereby obtaining an unmodified copolymer.

The modified copolymer can be produced by reacting the unmodified copolymer with a modifier in a solvent. In the invention, groups such as an acryloyl group and methacryloyl group can be introduced into the unmodified copolymer, which is a rubber component, via ester bonds, by using an unsaturated carboxylic acid or a derivative thereof as the modifier.

As the modifier, an acyclic acid, methacrylic acid, their ester derivatives, acid halide derivatives, and the like can be given. As the ester derivatives, methyl acrylate, methyl methacrylate, 2-ethylhexyl acrylate, and the like can be given. As preferable examples of the acid halide derivatives, acrylic acid chloride, methacrylic acid chloride, acrylic acid bromide, and the like can be given.

When acrylic acid or methacrylic acid, which are organic acids, are used, the reaction rate can be increased by removing water produced during the reaction, together with the solvent, by azeotropic distillation. In this instance, the reaction velocity can be increased by using an acid compound (e.g. sulfuric acid, paratoluenesulfonic acid, etc.) as a catalyst.

In the modification reaction, the modifier is used preferably in an amount of 0.1 to 50 g per 100 g of the unmodified copolymer.

A reaction temperature of −20 to 120° C. and a reaction time of 1 hour to 4 days are appropriate.

As the solvent, toluene, ethyl acetate, cyclohexane, benzene, ether, petroleum ether, and the like can be given as preferable examples. In the invention, the modification reaction may also be carried out without using a solvent.

Taking into consideration ease of reaction control and stirring, the concentration of the unmodified copolymer in the solvent is 50 wt % or less, and preferably 40 wt % or less. If more than 50 wt %, it is difficult to ensure homogeneity of the reaction system, because the mixture can be stirred only with difficulty due to an increased viscosity.

In the invention, a radical scavenger is added during the modification reaction in an amount of 1 mg to 1 g, and preferably 2 mg to 0.5 g, per 100 g of the unmodified copolymer.

The radical scavenger is added to avoid a possible reaction of substituents originating from the modifier introduced by the reaction due to the thermal history during the reaction or post-reaction treatment or excessive irradiation.

As the radical scavenger, a quinone compound, a metal, and the like which are used as a common polymerization inhibitor are suitable. As specific examples, hydroquinone monomethyl ether, 2,5-di-t-butylhydroquinone, 4-hydroxydiphenylamine, and copper powder can be given.

After the reaction, the reaction solution is distilled under reduced pressure to remove the solvent, unreacted modifier, and the like, thereby obtaining a modified copolymer.

When there is a large amount of unreacted modifiers, it is possible to add water to the reaction solution, separate an organic layer from a water layer, and extract the modified copolymer from the organic layer.

The modified copolymer obtained in this reaction is a copolymer in which the hydroxyl group of the unmodified copolymer is substituted by an esterification reaction.

The reaction can be confirmed by an IR spectrum and NMR spectrum.

The substitution rate of the hydroxyl group by the modifier in this reaction is preferably 20 to 100 mol %, more preferably 40 to 100 mol %, and still more preferably 50 to 100 mol % of the total hydroxyl groups. If the substitution rate is less than 20 mol %, the effect of modification may not be exhibited.

Specifically, the modified copolymer of the invention contains the molecular end with a structure of $H_2C\!=\!C(R^5)\!-\!COO\!-\!$ preferably in an amount of 20 to 100 mol % of the total end groups.

The substitution rate in this reaction can be determined by $^{13}C$-NMR spectrum analysis. However, there may be the case in which a single peak cannot be obtained in the carbonyl group region after the reaction due to the difference of monomers at the ends of residual raw materials and raw material copolymers. In such a case, the substitution rate is calculated by counting only peaks appearing after the reaction among the peaks in the carbonyl group region.

EXAMPLES

The invention will now be described in more detail by way of examples. Hydroxyl group-containing (co)polymers (unmodified (co)polymers) and modified (co)polymers were analyzed as follows.

(1) Microstructure of Diene Parts

Calculated from the peak area ratios of 5.2 to 5.8 ppm (cis: C), 5.2 to 5.8 ppm (trans: B), and 4.7 to 5.1 ppm (vinyl: V) in the $^1$H-NMR spectrum of the (co)polymers.

(2) Styrene Content

Determined from the following formula by using C, B, and V in (1) above and the peak areas of 4.7 to 5.8 ppm (absorption of diene: H) and 7.0 to 7.4 ppm (absorption of styrene: S) in the $^1$H-NMR spectrum of the copolymers.

Styrene content (mol %)=$(S/5H)/(S/5H+((C+B)-V/2H)/2H+V/2H)$

(3) Number Average Molecular Weight

Measured using a VPO analyzer (Corona 114-type molecular weight analyzer). Sample (co)polymers were dissolved in toluene to prepare three samples with different concentrations in a range from 0.15 g/25 ml to 0.65 g/25 ml. A toluene solution of benzil was prepared as a reference. The molecular weight was calculated by comparing the analytical results of the samples, the reference, and the solvent.

(4) Hydroxyl Group Content 25 ml of a pyridine solution of phthalic anhydride was added to about 5 g of the hydroxyl group-containing (co)polymer and heated at about 100° C. to dissolve. After cooling, 70 ml of ½N sodium hydroxide aqueous solution and a small amount of a titration indicator (phenolphthalein/pyridine solution) were added and the mixture was homogenized. The sample was titrated with a ⅕ N sodium hydroxide aqueous solution until the mixture changed in color from white to red. The point at which the changed color was maintained for 15 seconds was regarded as the end point. A blank test was carried out without adding the (co) polymer to calculate a reference value (B). The hydroxyl group content was calculated using the following formula.

Hydroxyl group content (mol/kg)=$(B'-S')\times N/W$

W: Amount of (co)polymer (g)
B': Titration amount in the blank test (ml)
S': Titration amount in the test using a sample (ml)
N: Normality of ⅕ N sodium hydroxide aqueous solution

Preparation Example 1

<Preparation of Hydroxyl Group-Containing Butadiene-styrene Copolymer>

A 1 l autoclave was charged with 239.4 g (4.4 mol) of 1,3-butadiene, 75.6 g (0.73 mol) of styrene monomer, 198.5 g of isopropyl alcohol, 1.8 g of water, and 67.5 g of 35% hydrogen peroxide water. The mixture was heated to 130° C. over 60 minutes and further reacted for 60 minutes. After cooling and depressurizing, the content was removed and washed with water using a separating funnel. After allowing to stand for 2 to 3 hours, the organic layer was removed and the solvent and the like were evaporated at 70° C. for one hour using an evaporator, followed by further processing under reduced pressure at 100° C. for two hours, thereby obtaining 205 g of a hydroxyl group-containing butadiene-styrene copolymer as a residue. Analytical data of the copolymer is as follows.
Microstructure of diene portion: cis:trans:vinyl=20:60:20
Styrene content: 15 mol %
Number average molecular weight: 1,750
Hydroxyl group content: 1.14 mol/kg

Preparation Example 2

<Preparation of Hydroxyl Group-containing Butadiene-styrene Copolymer>

158 g of hydroxyl group-containing butadiene-styrene copolymer was obtained in the same manner as in Preparation Example 1, except for reducing the amount of 35% hydrogen peroxide water to 22.5 g. Analytical data of the copolymer is as follows.
Microstructure of diene portion: cis:trans:vinyl=20:60:20
Styrene content: 15 mol %
Number average molecular weight: 3,000
Hydroxyl group content: 0.56 mol/kg

Preparation Example 3

<Preparation of Hydroxyl Group-containing Butadiene Homopolymer>

A 1 l autoclave was charged with 315 g (5.8 mol) of 1,3-butadiene, 185 g of isopropyl alcohol, 22.6 g of water, and 45 g of 35% hydrogen peroxide water. The mixture was heated to 130° C. over 60 minutes and further reacted for 90 minutes. After cooling and depressurizing, the content was removed and washed with water using a separating funnel. After allowing to stand for 2 to 3 hours, the organic layer was removed to remove the solvent and the like by evaporation at 70° C. for one hour, followed by further processing under reduced pressure at 100° C. for two hours, thereby obtaining 190 g of a hydroxyl group-containing butadiene homopolymer as a residue. Analytical data of the polymer is as follows.
Microstructure of diene portion: cis:trans:vinyl=20:60:20
Number average molecular weight: 2,800
Hydroxyl group content: 0.71 mol/kg

Example 1

<Preparation of Modified Butadiene-styrene Copolymer>

A 1 l separable flask of which the internal atmosphere has been replaced with nitrogen was charged with 100 g of the hydroxyl group-containing copolymer prepared in Preparation Example 1. After adding 600 ml of ether and homogeneously dissolving the polymer, the mixture was heated to evaporate off about 100 ml of ether. The copolymer solution was cooled over an ice-cooled bath and 500 mg copper powder and 22 ml of acrylic acid chloride were added in this order. After stirring the mixture at room temperature for 24 hours, the solvent was evaporated to collect 110 g of a modified copolymer as a residue.

FIG. 1 shows a $^{13}$C-NMR spectrum chart of the modified copolymer. A peak originating from the carbonyl group (C=O) of acrylic acid chloride appeared near 170 ppm in the chart. The area ratio of this peak was calculated to confirm that the substitution rate of hydroxyl groups with acryloyl groups was 100%. The number average molecular weight of the modified copolymer was 1,900.

Example 2

<Preparation of Modified Butadiene-styrene Copolymer>

A modified copolymer was obtained in the same manner as in Example 1, except for using the hydroxyl group-containing copolymer prepared in Preparation Example 2 instead of the hydroxyl group-containing copolymer of Preparation Example 1. The substitution rate of hydroxyl groups with acryloyl groups in this modified copolymer was 76%. The number average molecular weight of the modified copolymer was 3,200.

Comparative Example 1

<Preparation of Modified Butadiene Homopolymer>

A modified polymer was obtained in the same manner as in Example 1, except for using the hydroxyl group-containing homopolymer prepared in Preparation Example 3 instead of the hydroxyl group-containing copolymer Preparation Example 1. The substitution rate of hydroxyl groups with acryloyl groups in this modified polymer was 100%. The number average molecular weight of the modified polymer was 3,000.

<Evaluation of Adhesiveness>

Copolymers prepared in Examples and Comparative Examples were applied to rubber sheets (thickness: 1 mm) made from chloroprene. PET sheets (thickness: 0.1 mm) with the same shape as the rubber sheets were applied to the coated surfaces under a pressure of 1 MPa.

After heating at 90° C. for about 12 hours, the pressure-bonded sheets were allowed to stand at room temperature for 24 hours, thereby obtaining test specimens. The PET sheets were removed from the rubber sheets in accordance with JIS K6854 to determine the strength from the load. The evaluation was carried out three times for each modified polymer and the average was regarded as the peeling strength. The results are shown in Table 1.

TABLE 1

|  |  | Peel strength (N) |
|---|---|---|
| Preparation Example 1 | Hydroxyl group- | 0.22 |
| Preparation Example 2 | containing copolymer | 0.27 |
| Comparative Example 1 | Hydroxyl group-containing homopolymer | 0.17 |
| Example 1 | Modified copolymer | 0.72 |
| Example 2 |  | 0.75 |
| Comparative Example 1 | Modified homopolymer | 0.55 |

INDUSTRIAL APPLICABILITY

These modified copolymers of the invention are suitable for applications such as a compatibilizer, adhesive, dispersant, and the like.

The invention claimed is:

1. A modified diene-α-olefin copolymer which is represented by the formula (1) below and has $H_2C=C(R^5)$—COO— in at least a cart of the ends, $$R^1-(CH-CH=CH-CH_2)_l-(CH_2-CH)_m-(CH_2-CH)_n-R^2 \atop R^3 \qquad\qquad CH=CHR^3 \quad R^4 \atop \phantom{xxxxxxxxxxxxxxxxxxxxxxxxxxxxxx} R^6$$ (1)

wherein $R^1$ and $R^2$ independently represent a hydroxyl group or $H_2C=C(R^5)$—COO—, $R^3$s, $R^5$s, and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition.

2. The modified diene-α-olefin copolymer according to claim 1, having a number average molecular weight of 300 to 10,000.

3. The modified diene-α-olefin copolymer according to claim 1, wherein the amount of α-olefin compounds is 1 to 90 mol % in the total amount of the copolymer.

4. The modified diene-α-olefin copolymer according to claim 1, wherein the proportion of the end with a structure of $H_2C=C(R^5)$—COO— is 20 to 100 mol % of the total end groups.

5. The modified diene-α-olefin copolymer according to claim 1, wherein the $R^4$ is a phenyl group.

6. A method for producing the modified diene-α-olefin copolymer according to claim 1, comprising reacting a diene-α-olefin copolymer shown by the following formula (2) with an unsaturated carboxylic acid shown by the following formula (3) or a derivative thereof, adding 1 mg to 1 g of a radical scavenger per 100 g of the copolymer, $$OH-(CH-CH=CH-CH_2)_l-(CH_2-CH)_m-(CH_2-CH)_n-OH \atop R^3 \qquad\qquad CH=CHR^3 \quad R^4 \atop \phantom{xxxxxxxxxxxxxxxxxxxxxxxxxxxxxx} R^6$$ (2)

wherein $R^3$s and $R^6$s independently represent a hydrogen atom or an alkyl group having 1 to 10 carbon atoms, $R^4$s independently represent a phenyl group, a pyridyl group, a chlorine atom, a cyclohexyl group, or a carbonyloxyalkyl group, and l, m, and n represent the number of repetition, $$H_2C=C(R^5)-COOH$$ (3)

wherein $R^5$ is a hydrogen atom or an alkyl group with 1 to 10 carbon atoms.

7. The method for producing the modified diene-α-olefin copolymer according to claim 6, wherein the diene-α-olefin copolymer is reacted with the unsaturated carboxylic acid or a derivative thereof in a solvent, the concentration of the copolymer in the solvent being 50 wt % or less.

8. The modified diene-α-olefin copolymer according to claim 1, wherein $R^3$, $R^5$ and $R^6$ are each independently a hydrogen atom or a methyl group.

9. The modified diene-α-olefin copolymer according to claim 1, wherein a molar ratio of structural unit originating from conjugated diene compounds to structural unit originating from α-olefin compounds is 10:90 to 99:1.

10. The modified diene-α-olefin copolymer according to claim 1, wherein a molar ratio of structural unit originating from conjugated diene compounds to structural unit originating from α-olefin compounds is 20:80 to 98:2.

11. The modified diene-α-olefin copolymer according to claim 1, wherein a molar ratio of structural unit originating from conjugated diene compounds to structural unit originating from α-olefin compounds is 30:70 to 97:3.

12. The modified diene-α-olefin copolymer according to claim 1, wherein $R^4$ is a carbonyloxyalkyl group selected from the group consisting of carbonyloxymethyl and carbonyloxyethyl.

13. The modified diene-α-olefin copolymer according to claim 1, having a number average molecular weight of 500 to 5,000.

* * * * *